United States Patent [19]

Bhattacharya

[11] 3,816,249

[45] June 11, 1974

[54] UNIVERSAL MEDIUM AND METHOD FOR EXTENDING THE USEFUL LIFE OF SEMEN IN VITRO

[76] Inventor: Bhairab C. Bhattacharya, Omaha, Nebr.

[22] Filed: Feb. 28, 1973

[21] Appl. No.: 336,454

Related U.S. Application Data

[63] Continuation-in-part of Ser. No. 92,226, Nov. 23, 1970, abandoned.

[52] U.S. Cl. ................................. 195/1.8, 424/105
[51] Int. Cl. ........................... C12b 1/00, C12b 3/00
[58] Field of Search ...................... 195/1.8; 424/105

[56] References Cited
UNITED STATES PATENTS 3,185,623  5/1965  Smith et al. ........................... 195/1.8
3,431,172  3/1969  Rajamannan ........................ 195/1.8

Primary Examiner—Sam Rosen
Attorney, Agent, or Firm—Bacon & Thomas

[57] ABSTRACT

A universal medium for extending the useful life of semen, in vitro, is provided comprising, in effective amounts, egg yolk, α-aminopropionic acid, and glycine. If the semen is to be stored for long periods of time at reduced temperature it is preferred that glycerol and an ionizable salt, such as sodium chloride, be utilized in the medium. The medium has general utility for extending the life of semen from all types of mammals and birds and is especially valuable for extending the useful life of sensitive types of semen, such as turkey semen. Such sensitive types of semen can now be kept viable until they can be frozen. The invention provides for storage by freezing of types of semen which have not before been successfully frozen.

22 Claims, No Drawings

UNIVERSAL MEDIUM AND METHOD FOR EXTENDING THE USEFUL LIFE OF SEMEN IN VITRO

PRIOR APPLICATION

This application is a continuation-in-part of my application Ser. No. 92,226, filed November 23, 1970, now abandoned.

BACKGROUND OF THE INVENTION

This invention relates to a universal medium for extending the useful life of semen. The medium is used to extend the life of spermatozoa in the semen in vitro The composition of the seminal plasma of different species of mammals and birds varies from species to species. For example, the pH, osmolality, density, viscosity, etc. of the seminal plasma of different species are not the same. These properties of the seminal plasma are important for the survival and the retention of the fertilizing capacity of the spermatozoa, in vitro.

Some success has been achieved in the cattle industry by using diluted bull semen either in liquid form or in frozen form. The mechanism of the dilution and freezing is not, however, clearly understood. Specific formulae for media have been developed for various species of mammals and birds. However, there is no universal formula for a medium which can be used for the dilution and freezing of semen from many different species.

A universal medium can not be devised unless the metabolism of a substantial number of the spermatozoa can be stopped, minimized, controlled or interrupted to such an extent that death of the spermatozoa will not occur in the particular medium. The spermatozoa must retain their full fertilizing capacity and overcome the pH and temperature shocks and the osmotic stress. Poultry semen is particularly sensitive to stress and shock. The preservation of the activity of sperm cells of poultry, such as in chicken and turkey semen, has been a continuous problem to the poultry industry. Whereas bull semen has been preserved in frozen form for substantial lengths of time, no successful freezing of turkey semen has been reported. Turkey spermatozoa is so hyperactive that it perishes within a few minutes outside of the body even in its own seminal fluid. The spermatazoa of other species have been successfuly frozen and stored at liquid nitrogen temperature (−196°C) using glycerol as a stabilizer. Many attempts have been made to similarly freeze turkey semen, but no success prior to the present invention has been reported. The apparent reason for this failure is that the freezing process requires a few hours of equilibrium time and it has not heretofore been possible to keep turkey semen viable during this period of time.

SUMMARY OF THE INVENTION

Accordingly, it is an object of this invention to provide a universal medium for extending the useful life of semen from many species of mammals and birds, in vitro.

Another object of this invention is to provide a universal medium which stops, minimizes, or interrupts the metabolism of the spermatozoa to such an extent that the life span of the spermatozoa is prolonged in this particular medium.

Another object is to provide a universal medium in which spermatozoa can retain their full fertilizing capacity and overcome pH and temperature shocks and osmotic stress.

Another object of this invention is to provide a medium and method for extending the useful life of poultry semen, especially semen obtained from turkeys.

A still further object of this invention is to provide a medium and method for preserving turkey semen in frozen form.

These objects are obtained by utilizing a universal medium comprising egg yolk or an equivalent amount of water soluble ingredients contained in egg yolk, α-aminopropionic acid, glycine, and a bacteriocidal or bacteriostatic agent such as antibiotics or sulpha drugs. If semen is to be stored for long periods of time at reduced temperatures, it is preferred that glycerol and an ionizable salt, such as sodium chloride or other alkali metal salt, be added to the universal medium of this invention. The alkali metal salts are also useful for obtaining the desired osmolality, usually between 250–350 mos/kg, preferably about 300 mos/kg. Sensitive types of semen, such as turkey semen, are preferably collected directly into the medium and, if preservation by freezing is desired, the mixture is held at 8°–10°C for a sufficient time, e.g., 3 or 4 hours, to attain glycerol equilibrium inside and outside the cell membranes prior to freezing. Alternatively, it may be stored at 0° to 10°C for up to about 72 hours prior to use.

DESCRIPTION OF THE PREFERRED EMBODIMENTS

The medium of the invention, in its broad aspects comprises a combination of egg yolk, α-aminopropionic acid and glycine. If the semen is to be frozen, it is preferred that glycerol and an ionizable salt, such as sodium chloride, be utilized in the medium.

More specifically, where freezing is contemplated, the medium comprises, by weight, from about 0.01 percent to about 1.0 percent glycine; from about 0.01 percent to about 1.0percent α-aminopropionic acid; from about 0.1 percent to about 2.0 percent of an ionizable salt, from about 4 percent to about 12 percent of glycerol; from about 30 percent to about 55 percent egg yolk; and from about 30 percent to about 70 percent water.

Glycine has the following chemical formula:

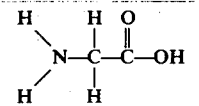

It occurs as colorless, monoclinic crystals having a sweet taste and is highly soluble in water but partly soluble in alcohol and ether.

In this invention, glycine is utilized in the medium in an effective amount in combination with α-aminopropionic acid to extend cell life. Preferably glycine comprises from about 0.01 percent to about 1.0 percent by weight of the medium. Spermatozoa preferentially absorb glycine and α-aminopropionic acid from the medium and, it is believed, that the glycine and α-aminopropionic help the spermatozoa to overcome temperature shock and help to control adverse amino acid metabolism within the cells.

Glycine is also amphoteric and, in combination with the α-aminopropionic acid, acts as a buffer with the egg yolk water soluble ingredients. The measured pH of the medium is 6.2 but the buffering capacity would cover the range from about pH 6.0 to about pH 8.0. Most semen samples fall within this restricted pH range. Other buffer salts can be included if desired, including alkali metal bicarbonates and alkali metal citrates. For example, alkali metal bicarbonate can be added to provide a pH of about 7.0.

An effective amount of α-aminopropionic acid for cooperation with the glycine in extending cell life is also utilized in this medium. α-aminopropionic acid has the following formula:

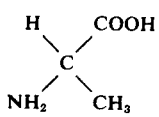

Both the levorotary and dextrorotary isomers can be used singly or in combination in this medium. Preferably, α-aminopropionic acid is utilized in amounts ranging from about 0.01 percent to about 1.0 percent by weight of the medium.

As hereinbefore described, the α-aminopropionic acid is amphoteric and, therefore, also functions as a buffering agent along with the glycine.

An ionizable inorganic salt of the type known to be beneficial to cell life is preferably included in the medium. For example, chloride salt selected from the group consisting of sodium chloride, potassium chloride and calcium chloride may be utilized in effective amounts, preferably from about 0.1 percent to about 2.0 percent by weight of the medium. The chloride salts help to increase the viscosity of the diluted egg yolk solutes. Such salts are also desirable for obtaining the proper osmotic pressure.

An effective amount of glycerol is utilized in this medium to help keep spermatozoa alive at reduced temperatures in the vicinity of 0°C. and below and for prolonged time intervals. Preferably, from about 4 percent to about 12 percent glycerol is utilized in this medium. If the spermatozoa are to be kept at reduced temperatures for less than 48 hours, the glycerol can be eliminated from the medium.

Avian egg yolk usually comprises from 30 to 55 percent of this medium. The essential nutrients for the spermatozoa are contained in the yolk. The composition of avian egg yolk changes from species to species but the following composition for hens egg is illustrative:

| COMPONENT | TOTAL GMS. |
|---|---|
| Water | 9.1 |
| Solids | 9.6 |
| Organic material | 9.4 |
| Proteins | 3.1 |
| Lipids | 6.1 |
| Carbohydrates | 0.2 |
| Inorganic material | 0.2 |

Egg yolk is a typical emulsion system of oil droplets in an aqueous medium. It has been generally assumed that lecithin is the constituent that makes egg yolk an effective emulsifier. There is some evidence, however, that the emulsifying action is due to an unstable complex containing lecithin and protein. I have found that a portion of the egg yolk may be substituted by an aqueous solution of soya bean lecithin containing an amount of lecithin equivalent to that in egg yolk. Satisfactory results are obtained when 50 percent or more of the egg yolk lecithin is substituted in this manner by soybean lecithin. It will be understood that reconstituted dried egg yolk as well as fresh egg yolk can be used. The water soluble vitamins in egg yolk, for example, biotin, may be considered to play an important role in the extra mitochondrial biosynthesis for lecithin which may be used by the spermatozoa as a source of energy when the glycolytic metabolism is checked by the extra amounts of glycine and alanine in the intramitochondrial reaction.

The remainder of the medium of this invention is comprised of distilled or boiled water, usually in amounts ranging from 30 to 70 percent by weight of the composition. Removal of carbon dioxide from the water prior to using it in this medium will facilitate pH adjustment and buffering of the medium.

This medium can be used with semen from many species of mammals and birds to preserve and prolong the life of spermatozoa in the semen. This medium, for example, has been utilized with good results in extending the useful life of semen from humans, cattle, buffalos, rabbits, chinchillas and poultry. It is especially useful in extending the useful life of poultry semen, in particular, turkey semen.

Although the theory for the superior results obtained in this invention has not been proven it is believed that the glycine and α-aminopropionic acid are absorbed into the cells and prevent hyperglycolitic metabolic action therein. Further, they serve as buffering agents in the medium to prevent changes in the pH of the semen. Glycine and glycerol both are believed to function to prevent temperature shock and retain the spermatozoa in a live state at reduced temperatures.

In using this medium, semen from any mammal or bird is mixed with the medium, preferably in a range of from about 1:1 to 1:40 parts semen to parts medium. The mixture can then be refrigerated at temperatures of about 0°C. to about 10°C for prolonged periods, or may be frozen for storage over even longer periods.

One method for insemination of mammals comprises preparation of insemination capsules, preferably before the above refrigeration process, containing at least 20,000,000 live spermatozoa per capsule dispersed in the medium of the invention. These capsules after bringing to approximate body temperature are inserted into the cervix with the help of forceps and and a disposable catheter when insemination is desired.

For insemination of poultry, for example, turkeys, the fresh semen from the male birds is preferably collected directly into a quantity of the medium of the invention and mixed therewith. The container of diluted semen may then be stored at 8°–10°C or at lower temperature for at least 72 hours without adversely effecting the spermatozoa fertilizing capacity. If it is to be frozen and stored at temperatures below 0°C, glycerin is added prior to freezing. In this manner, the semen may be stored for substantially any desired period of time. It can then be warmed to appropriate temperature for use. The hens can be inseminated with an automatic syringe using the semen directly from the container. By use of this mass collection and insemination technique the labor and time factors can be considerably reduced. Moreover, the number of male birds required is less than required by conventional collection and insemination procedures with fresh semen.

Preferably, an antibiotic is added to the mixture to prevent or control bacterial development. Penicillin can be used. However, for prevention of bacterial infections in poultry it is preferred to use neomycin. Accordingly, the preferred form of the medium contains a minor but effective amount of an antibiotic.

EXAMPLES

The following examples illustrate specific preferred embodiments of this invention and are not intended to be limiting All percentage and ratios in the examples as well as in the specification and claims are by weight unless otherwise indicated. Temperatures are expressed in degree centigrade.

EXAMPLE I

Fresh chicken eggs are cleaned and sterilized with cotton swabs soaked in 70 percent alcohol and dried. The shell is cut into two halves, the egg white is separated from the yolk, and the yolk, in intact membrane, is taken on an absorbent filter paper. The membrane is pierced with a glass rod and the yolk is collected in a beaker. Fresh solutions of 0.5 percent glycine, 0.5 percent dl-α-aminopropionic acid and 2 percent NaCl are prepared using boiled distilled water (boiled to remove the dissolved $CO_2$). The solutions are cooled to room temperature.

The mixture is prepared using the above mentioned ingredients as follows:

| | | |
|---|---|---|
| 0.5% aqueous glycine solution | 17 ml. | |
| 0.5% aqueous alanine solution | 17 ml. | |
| 2.0% aqueous sodium chloride | 17 ml. | |
| Egg yolk | 49 ml. | |

To this 100 ml. mixture is added 600,000 units of Bacillin (Benzthine Penicillin G and Procain Penicillin G in equal amount).

The mixture is stirred with a glass rod and kept in a refrigerator (0°–12°C) for approximately 12 hours for salting out precipitate. The mixture is brought to room temperature and centrifuged for 1 hour at 4,000 g. The clear solution is separated and stored at refrigerated temperatures (4°C.). The pH of the mixture is 6.2 and the osmolality measured ranged from 296 and 315 mos/kg.

For obtaining a dry form of the medium, the mixture can be dried under vacuum at 40°C for 12 hours when the chance of denaturature of the protein is at a minimum. The volume is reduced at 80 percent of the original volume. The dry mass is powdered and stored. The mixture in dry form can be stored in a vacuum container. Because of the lyophilic nature of the colloid mixture, addition of 80 percent distilled water will form a clear solution. Any precipitate is removed by centrifugation.

The glycerol can be added at any time but, preferably, is added to this mixture after semen is added to the mixture.

EXAMPLE II

A portion of the mixture of Example I not containing glycerol is warmed to room temperature. Fresh semen (bull) just after ejaculation is mixed (1 ml. to 10 ml. mixture) with the mixture is pipetted out for microscopic examination. When the motility of the spermatozoa remains between four and five grades (the fresh semen of the species had a standard grade of five), the mixture is accepted for further processing. A calculated amount of cold glycerin and mixture is mixed to form a 15 percent glycerin mixture. When the temperature of the sperm mixture has attained 4°C. (usually in 2 hours), the glycerin mixture is slowly and drop by drop added to the sperm mixture (1: ) and shaken constantly. The final concentration of glycerin in this mixture is 7.5 percent. The mixture is kept at 4°C. to bring about an equilibrium of glycerin with the spermatozoa. The equilibrium time varies with different species and there may be an individual variation. For chinchilla semen, one hour is sufficient, for humans 3 hours, poultry 4 hours, rabbits 6 hours, bulls 12 hours, and horse 1 hour.

When the equilibrium is reached (tested by putting a small sample in liquid nitrogen vapour for 15 minutes and observing the motility and survival rates of the spermatozoa after thawing), for insemination of mammals one ml samples containing at least 20 millions live spermatozoa are taken in a gelatin capsule, closed and put over liquid nitrogen vapour for 15 minutes and then stored in liquid nitrogen. In the above case, on bull semen, survivial and motility of the spermatozoa were excellent. Fertilization was accomplished by placing a capsule in the cervix of a cow.

EXAMPLE III

Substantially the same results as in Example I are obtained when human semen, buffalo semen, hog semen, chinchilla semen, rabbit semen and horse semen are utilized.

Substantially the same results as in Example I are obtained when potassium chloride and calcium chloride are partly substituted for sodium chloride.

EXAMPLE IV

A mixture especially useful for extending the life of turkey semen and for preventing bacterial infections in the medium and in the inseminated birds is prepared in the manner set forth in Example I except that neomycin base, in the amount of 0.35 gm. per 100 ml of total volume, is used as an antibiotic in place of penicillin.

In any of the mixtures described above, a portion of the egg yolk lecithin may be replaced with soybean lecithin. Good results have been obtained when 50% of the egg yolk lecithin was replaced with soybean lecithin.

EXAMPLE V

A mixture was prepared as in Example IV. It had a pH of 6.1 and an osmolality of 301.5. The clear medium was used for diluting fresh turkey semen and the mixture was stored for 2 days at 4°C. It was then brought to a temperature of 25°C and used to inseminate twelve turkey hens. Eggs collected from these hens one day prior to insemination were incubated and found to have a fertility rate of 15 percent. Eggs collected one day after insemination with the mixture of the invention were incubated with a fertility rate of 75 percent. Eggs collected two days after insemination with this mixture were incubated with a fertility rate of 89 percent.

EXAMPLE VI

Semen from 53 turkey toms (volume equal to 20 ml) was collected directly into 150 ml of the medium of this invention prepared as in Example IV and having a temperature of 25°C. The resulting mixture of semen and medium was stored at 8°–10°C for over 12 hours and was then used at 25°C for mass insemination of a flock of 1,500 turkey hens, 0.1 ml per insemination. Sperm differential count for live and dead revealed that 1 million live sperm and a total of 13 million sperms were used per each insemination. The fertility and hatchability rates of eggs collected from this flock were within several percent of the rates for eggs collected from a control group of turkey hens which had been inseminated with fresh semen within 5 minutes of the time of its collection. Moreover, by using the mass collection of the semen from the 52 toms into the container of diluent medium and inseminating the hens with an automatic syringe using the semen-medium mixture directly from the collection container the labor cost and time were reduced by approximately half. This technique further reduced the number of toms needed by 39 percent, from 85 toms needed for the fresh semen collected and applied by the usual techniques to 52 toms by the mass technique.

EXAMPLE VII

Medium pursuant to the present invention was prepared by the general method of Example I from the following materials:

| | |
|---|---|
| Glycine | 7.0 grams |
| DL-Alanine | 5.0 grams |
| Sodium Bicarb | 1.0 grams |
| Sodium Chloride | 1.0 grams |
| Neomycin Sulfate | 10 tablets (3.6 grams) |
| 300ml egg yolk | |
| 700ml Boiled distilled water | |

The resulting medium had a pH of 7.0, an osmolality of 310 mos/kg and a density of 1.008. Semen from 15 turkey toms (10 ml) was collected and sucked directly into 20 ml of this medium, placed in a 50 ml polyethylene bottle at 21°C. Microscopical examination estimated a value of 85 percent or +++++ motile sperm immediately after collection. The semen-medium mixture was held at 4°C for 2 hours, and an equal amount of medium containing 18 percent by weight of glycerol was also brought to 4°C. The glycerol-medium mixture was mixed with the semen medium mixture drop-wise, constantly shaking the semen mixture.

The resulting semen and glycerol medium mixture was held at 4°C for another 4 hours to attain glycerol equilibrium inside and outside the cell membrane. Microscopic examination revealed that at this stage of the procedure the motility of the spermatozoa was still at 45 percent (+++). The mixture was divided into two polyethylene bottles and held in liquid nitrogen vapor for 5 minutes and then dipped in liquid nitrogen. Within 15 minutes the mixture was solidified. The structure and consistency of the polyethylene bottles did not change at all.

One of the frozen bottles was thawed at room temperature and the semen mixture was tested for life. 30 percent (++) of the spermatozoa still retained their high motility and characteristic progressive movement as in fresh semen. The frozen semen can be stored for a considerable period of time in liquid nitrogen with expectation of retention of approximately 30 percent of motile spermatozoa. The useful life of turkey semen will be sustained as long as the sample remains in liquid nitrogen.

EXAMPLE VIII

Comparative tests on the survival and motility of turkey spermatozoa in a medium containing glycine and in a similar medium containing both glycine and DL-alanine (dl-α-aminopropionic acid) were conducted on the following mixtures;

| A | | B | |
|---|---|---|---|
| Glycine | 1.0 gram | Glycine | 0.5 gram |
| NaCl | 0.1 gram | DL-Alanine | 0.5 gram |
| NaHCO₃ | 0.1 gram | NaCl | 0.1 gram |
| Egg yolk | 30.0 ml | NaHCO₃ | 0.1 gram |
| | | Egg yolk | 30.0 ml |

Each mixture, A and B, was made up to 100 ml with boiled distilled water cooled to room temperature, stirred for 5 minutes and then centrifuged at 4,000 r.p.m. for one hour, after which the liquid was separated from the sediment. The liquid in each instance had a pH of 6.6. Mixture A had an osmolality of 254 mos/Kg and mixture B had an osmolality of 281 mos/Kg.

2.0 ml of the mixture from each preparation was placed in a separate test tube. Approximately 0.5 ml of semen was collected from a turkey tom. 0.1 ml of this semen was added to each test tube, mixed with the medium therein and kept at 50°F. Samples were removed periodically over a time period of 48 hours and survival and motility observed under a microscope at 450 magnification.

The semen-mixture A samples showed substantial agglutination throughout the test period. There was substantially no agglutination observable in the samples of the semen-mixture B over this period. Survival of the sperm in the initial sample of the semen-mixture A was about 21 percent with fair motility and in the sample of the same mixture taken after 48 hours survival had decreased to about 11 percent with slight motility. The initial sample of the semen-mixture B showed about 31 percent survival with good sperm motility and the sample of the same mixture at the end of 48 hours showed about 21 percent survival with fair sperm motility. The importance of the presence of α-aminopropionic acid in the medium is therefore demonstrated. Turkey spermatozoa show better motility and survival in the presence of of α-aminopropionic acid and glycine and there is less agglutination in the α-aminopropionic acid — glycine mixture than in the mixture containing only glycine.

I claim:

1. A method for the preservation of poultry semen comprising mixing poultry semen containing live spermatozoa with an aqueous medium having a pH in the range of from about 6.0 to 8.0 and containing by weight from about 0.01 to 1.0 percent glycine, from about 0.01 to 1.0 percent α-aminopropionic acid, from about 0.1 to 2.0 percent sodium chloride, potassium chloride or calcium chloride, from about 30 to 70 percent water, and from about 30 to 55 percent of the components of egg yolk which are soluble in the mixture.

2. The method of claim 1 wherein the semen is collected from a plurality of male birds directly into said aqueous medium in a container and the mixture of semen and medium after storage in said container is used to inseminate a plurality of female birds.

3. The method of claim 1 wherein from about 4 to 12 percent by weight of glycerol is included in the medium.

4. The method of claim 2 wherein the semen is collected from a plurality of turkey toms and is used to inseminate a flock of turkey hens.

5. The method of claim 1 wherein the aqueous medium additionally contains a minor but effective amount of neomycin to control bacterial infections.

6. The method of claim 2 wherein from about 4 to 12 percent by weight of glycerol is included in the medium and the container of semen and medium is stored at a temperature of about 4° to 10°C for a time period of up to 48 hours prior to insemination of the female birds.

7. The method of claim 6 wherein the mixture of semen and medium after reaching equilibrium at 4° to 10°C is frozen in the container and is stored in frozen form until use.

8. A medium for extending the useful life of semen, in vitro, comprising a mixture of glycine, $\alpha$-aminopropionic acid and egg yolk in amounts effective in aqueous solution to extend the life of said semen.

9. The medium of claim 8 containing an ionizable chloride salt selected from the group consisting of sodium chloride, potassium chloride and calcium chloride in an amount effective to facilitate the storage of said semen.

10. The medium of claim 9 wherein the ingredients are in the form of a dry powdered solid admixture.

11. The medium of claim 9 wherein the ingredients are in aqueous solution at a pH in the range of about 6.0 to 8.0.

12. The medium of claim 11 wherein glycerol is present in an amount effective to facilitate storage of the solution at low temperatures.

13. The medium of claim 11 in admixture with semen containing live spermatozoa.

14. A universal medium for extending the useful life of semen, in vitro, comprising an aqueous solution having a pH in the range of from about 6.0 to 8.0, said solution containing, by weight, from about 0.01 percent to about 1.0 percent glycine, from about 0.01 percent to about 1.0 percent $\alpha$-aminopropionic acid, from about 0.1 percent to 2.0 percent of sodium chloride, potassium chloride or calcium chloride, from about 4 percent to about 12 percent of glycerol, from about 30 to about 55 percent egg yolk, and from about 30 percent to about 70 percent water.

15. A universal medium for extending the useful life of semen, in vitro, comprising a clear solution having a pH in the range of from about 6.0 to 8.0 and containing from about 0.01 to 1.0 percent glycine, from about 0.01 to 1.0 percent $\alpha$-aminopropionic acid, from about 0.1 to 2.0 percent sodium chloride, from about 30 to 70 percent water, and from about 30 to 55 percent of the components of egg yolk which are soluble in the mixture.

16. The medium of claim 15 admixed with semen containing live spermatozoa.

17. The composition of claim 16 in encapsulated form.

18. The medium of claim 15 wherein the pH of the solution is about 6.2 and the osmolality is from about 296–315 mos/kg.

19. The medium of claim 15 wherein from about 4 to 12 percent of glycerol is included.

20. A method for preparing a composition for extending the useful life of semen comprising mixing egg yolk, glycine, $\alpha$-aminopropionic acid, sodium chlrode and water to provide a solution having a pH in the range of about 6.0 to 8.0 and containing, by weight, from about 30 to 55 percent egg yolk, from about 0.01 to 1.0 percent glycine, from about 0.01 to 1.0 percent $\alpha$-aminopropionic acid, from about 0.01 to 2.0 percent of sodium chloride and from about 30 to 70 percent water, permitting the mixture to stand to form a precipitate, and separating the precipitate to provide a substantially clear product mixture.

21. The method of claim 20 wherein the clear solution is dried and a solid product is obtained.

22. The method of claim 20 wherein about 4 to 12 percent of glycerol is added to the mixture.

* * * * *